(12) United States Patent
Shen

(10) Patent No.: US 8,699,134 B2
(45) Date of Patent: Apr. 15, 2014

(54) ALTITUDE-AZIMUTHAL MOUNT FOR OPTICAL INSTRUMENTS

(75) Inventor: Dar Tson Shen, West Vancouver (CA)

(73) Assignee: Suzhou Synta Optical Technology Co. Ltd., Suzhou (CN)

(*) Notice: Subject to any disclaimer, the term of this patent is extended or adjusted under 35 U.S.C. 154(b) by 455 days.

(21) Appl. No.: 12/884,012

(22) Filed: Sep. 16, 2010

(65) Prior Publication Data

US 2012/0069434 A1  Mar. 22, 2012

(51) Int. Cl.
*G02B 23/16* (2006.01)

(52) U.S. Cl.
USPC .......................................... 359/429; 359/430

(58) Field of Classification Search
USPC ......... 359/429, 405, 421, 403, 430, 432, 399, 359/823, 822, 809; 342/359, 352, 357.06, 342/357.08; 248/183.1, 183.2, 183.3, 248/183.4, 184.1, 188.3, 188.5, 187.1; 396/428; 701/220; 725/72
See application file for complete search history.

(56) References Cited

U.S. PATENT DOCUMENTS

| | | | |
|---|---|---|---|
| 2,693,032 A | 3/1949 | Braymer | |
| 4,400,066 A | 8/1983 | Byers | |
| 5,173,803 A | 12/1992 | Heller | |
| 5,930,036 A | 7/1999 | Cluff | |
| 6,027,085 A | 2/2000 | Ruther | |
| D438,221 S | 2/2001 | Hedrick et al. | |
| 6,278,561 B1 | 8/2001 | Teske et al. | |
| 6,301,447 B1* | 10/2001 | Jackson et al. | 396/329 |
| 6,369,942 B1 | 4/2002 | Hedrick et al. | |
| 6,626,412 B1 | 9/2003 | Lindsay | |
| 6,972,902 B1 | 12/2005 | Chen et al. | |
| 7,004,649 B2 | 2/2006 | Dziulko | |
| 7,301,698 B2* | 11/2007 | Chen et al. | 359/399 |
| 7,339,731 B2* | 3/2008 | Baun et al. | 359/429 |
| 7,588,376 B2 | 9/2009 | Friedrich | |
| 2003/0156324 A1* | 8/2003 | Baun et al. | 359/430 |
| 2006/0103926 A1* | 5/2006 | Meyers et al. | 359/430 |
| 2007/0164177 A1 | 7/2007 | Peterson et al. | |
| 2009/0263118 A1* | 10/2009 | Mckay | 396/421 |
| 2010/0092165 A1* | 4/2010 | Cartoni et al. | 396/428 |

FOREIGN PATENT DOCUMENTS

| | | |
|---|---|---|
| CN | 201014153 | 1/2008 |
| CN | 201425650 | 3/2010 |
| DE | 19730928 | 1/1997 |
| DE | 10004541 | 8/2001 |
| DE | 202005001542 | 5/2005 |
| GB | 1125736 | 8/1968 |
| JP | 59176015 | 11/1984 |
| JP | 8014491 | 1/1996 |
| TW | 245421 | 10/2004 |

* cited by examiner

*Primary Examiner* — Frank Font

(74) *Attorney, Agent, or Firm* — Oyen Wiggs Green & Mutala LLP

(57) ABSTRACT

An alt-az mount for supporting and orienting optical instruments comprises: a generally horizontally extending arm couple to a level surface by an azimuthal pivot joint which permits pivotal movement of the horizontally extending arm with respect to the level surface about a vertical azimuthal axis; a generally vertically extending arm pivotally coupled to the horizontally extending arm by an inter-arm pivot joint which permits pivotal movement of the vertically extending arm with respect to the horizontally extending arm about a vertical inter-arm axis; and an instrument coupling mechanism for coupling the mount to an optical instrument, the instrument coupling mechanism comprising an altitude pivot joint which permits pivotal movement of the optical instrument with respect to the vertically extending arm about a horizontal altitude axis.

21 Claims, 12 Drawing Sheets

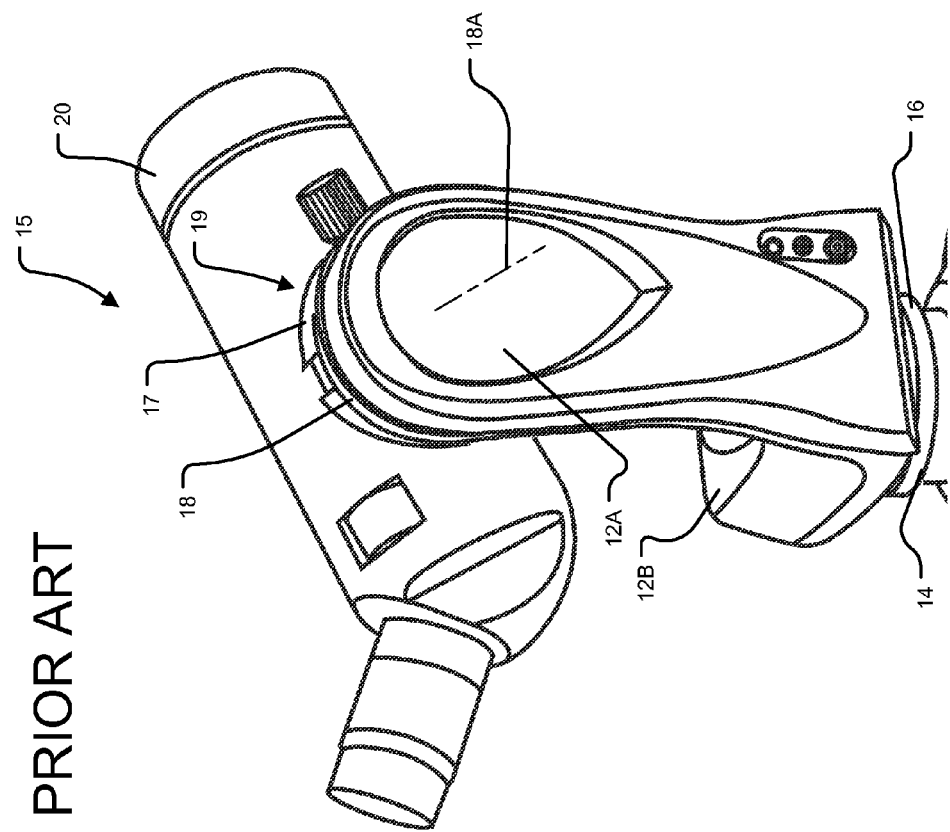
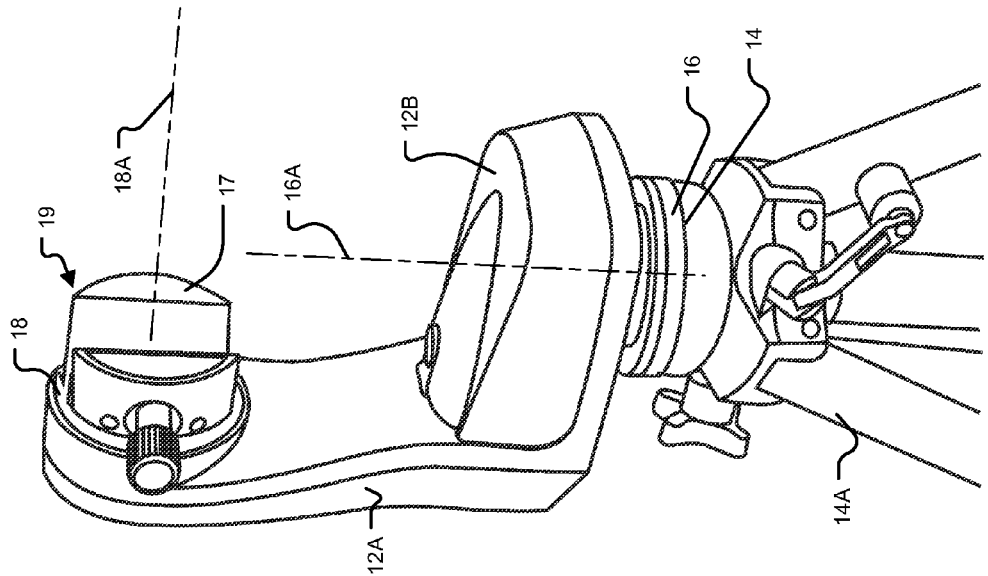
FIGURE 1B
FIGURE 1A
PRIOR ART

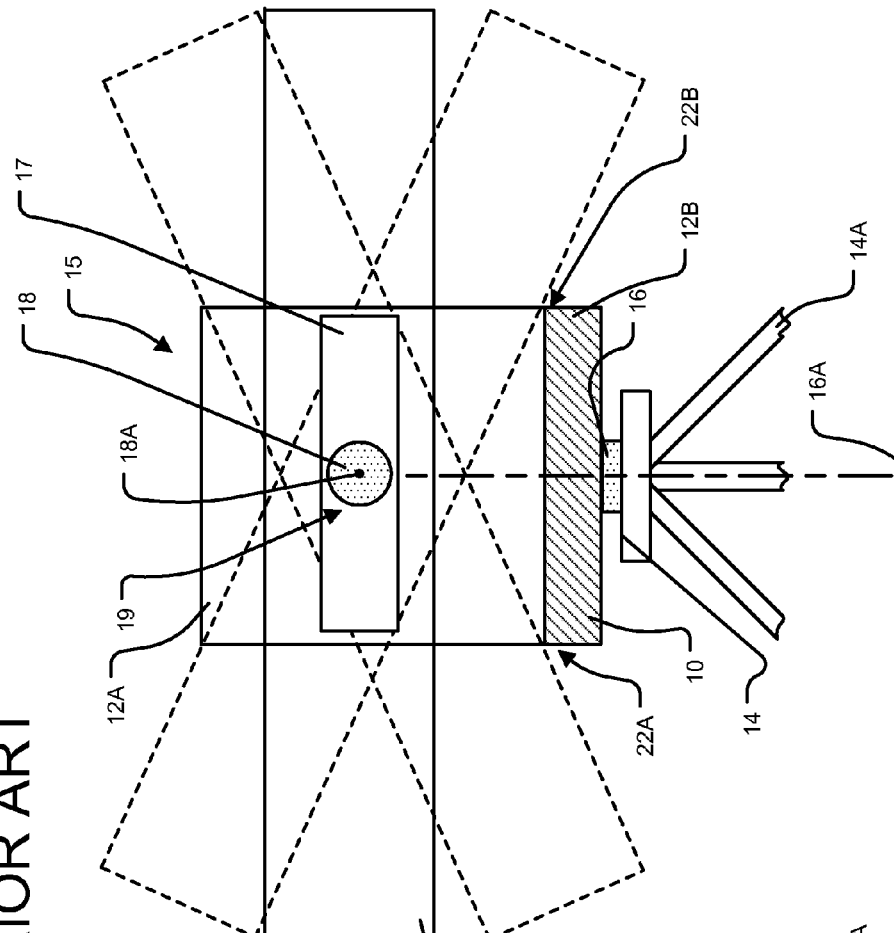
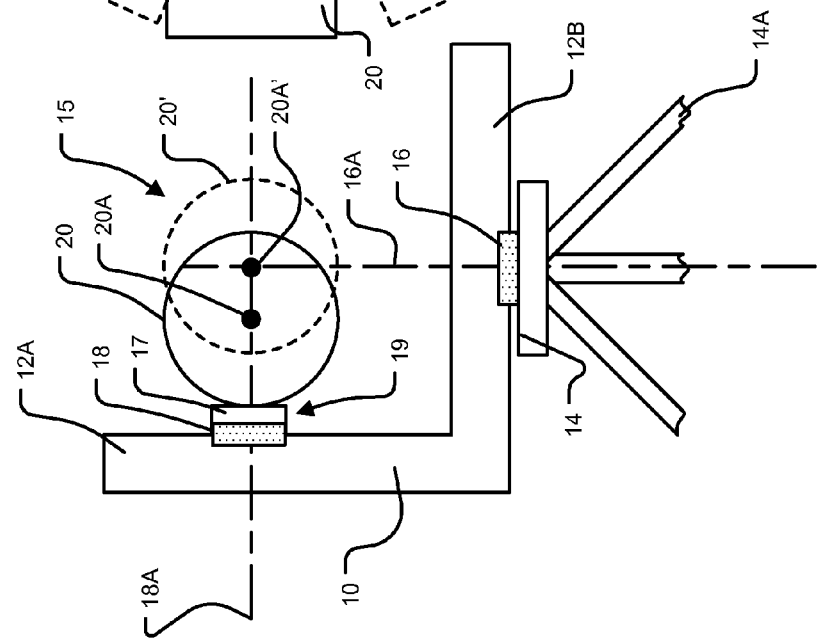
FIGURE 1C
FIGURE 1D
PRIOR ART

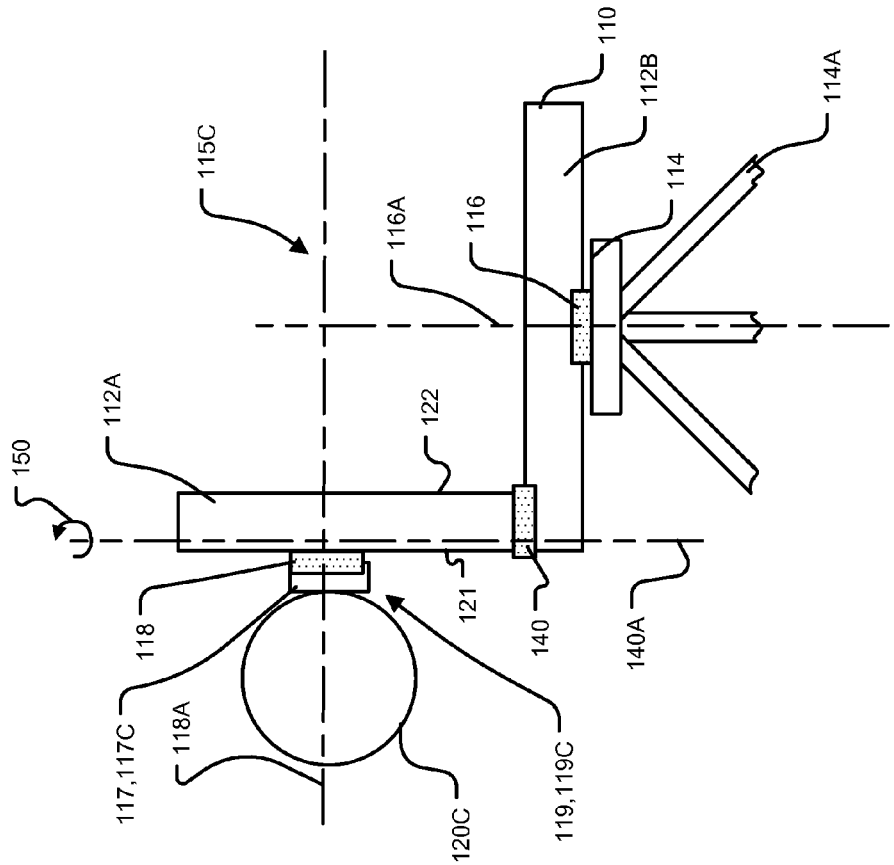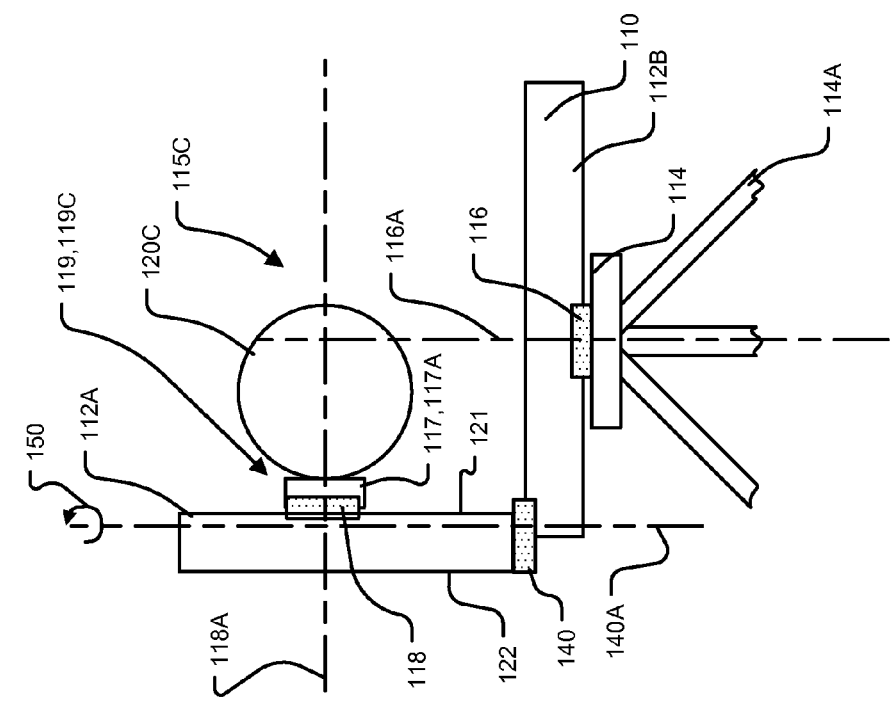

ALTITUDE-AZIMUTHAL MOUNT FOR OPTICAL INSTRUMENTS

TECHNICAL FIELD

The technology disclosed herein relates to optical instruments. Particular embodiments provide altitude-azimuthal mounts for optical instruments and methods for controlling same.

BACKGROUND

Telescopes and similar optical instruments may be supported by adjustable mounts, which are capable of adjusting the orientation of the optical instrument for viewing different objects. One popular optical instrument mount is the altitude-azimuthal mount, referred to hereinafter as the "alt-az mount". FIG. 1A is an isometric view of a prior art alt-az mount 10. FIG. 1B is an isometric view of alt-az mount 10 in use to support telescope tube 20 as part of a prior art telescope system 15. FIGS. 1C and 1D are a pair of schematic side elevation views of mount 10 and telescope system 15 which are useful for explaining the functionality thereof.

Mount 10 includes a generally vertical extending arm 12A and a generally horizontally extending arm 12B. Horizontal arm 12B is coupled to a level surface 14 via an azimuthal pivot joint 16. In telescope system 15, level surface 14 is provided by a tripod 14A or similar leveling system. Tripod 14A ensures that level surface 14 (and consequently horizontal arm 12B) are generally horizontally oriented and vertical arm 12A is generally vertically oriented. When mount 10 is leveled in this manner, pivot joint 16 coupled between tripod 14A and horizontal arm 12B permits pivotal movement of mount 10 about a generally vertically oriented axis 16A known as an azimuthal axis 16A.

Mount 10 also comprises an instrument coupling mechanism 19 by which an optical instrument (e.g. a telescope) 20 is coupled to vertical arm 12A. Instrument coupling mechanism 19 can take a wide variety of forms, depending on the particulars of the mechanism used to couple optical instrument 20 to vertical arm 12A. By way of non-limiting example, instrument coupling mechanisms 19 can include screw-based connection mechanisms, tongue and groove-based connection mechanisms, deformable (e.g. snap together) connection mechanisms and/or the like. Despite a variety of connection mechanisms, instrument coupling mechanisms 19 of alt-az optical instrument mounts (e.g. mount 10) tend to comprise: one or more instrument-engaging components 17 which fixedly engage optical instrument 20; and a pivot joint 18 coupled between instrument-engaging component(s) 17 and an edge or surface of vertical arm 12A which permits pivotal movement of instrument-engaging component(s) 17 and optical instrument 20 about a generally horizontally oriented axis 18A known as an altitude axis 18A.

Alt-az mounts (e.g. mount 10) are popular for telescope systems because alt-az mounts can be made relatively robust to support large telescope tubes (e.g. Dobsonian telescope tubes) and alt-az mounts can be fabricated from relatively inexpensive components.

The orientation of telescope 20 about altitude axis 18A and azimuthal axis 16A correspond to a set of coordinates referred to as altitude-azimuthal coordinates or alt-az coordinates. Alt-az coordinates are typically expressed in degrees of altitude (Alt) and degrees of azimuth (Az). Alt represents the angular orientation of telescope 20 about altitude axis 18A relative to the horizon and is typically expressed in a range of $-90° \leq \text{Alt} \leq 90°$. The point at Alt=90° (i.e. directly overhead) is referred to as the zenith. Az represents the angular orientation of instrument 20 about azimuthal axis 16A and has a range of $0° \leq \text{Az} \leq 360°$. Typically, Az is selected to represent the true (as opposed to magnetic) compass heading toward a point on the horizon and is measured eastwardly from North (i.e. North=0°; East=90°; South=180°; and) West=270°.

One characteristic of telescope systems employing alt-az mounts (like mount 10) is that every observer location on Earth has its own unique alt-az coordinate system. That is, the alt-az coordinates of particular objects (e.g. celestial objects) depend on the observer location. Accordingly, telescope users do not typically use alt-az coordinates to share information about the location of celestial objects.

Instead, telescope users typically describe the location of celestial objects in celestial coordinates. Celestial coordinates may also be referred to as "polar coordinates" or "equatorial coordinates" and are based on the notion of a celestial sphere centered at the Earth and having an undefined radius. Celestial coordinates describe the angular position of a celestial object on the celestial sphere in a manner that is independent of the observer location.

Celestial coordinates are expressed in degrees of declination (DEC) and hours of right ascension (RA). DEC represents a projection of the Earth's terrestrial latitude onto the celestial sphere. DEC has a range of $-90° \leq \text{DEC} \leq 90°$, where 0° is the projection of the Earth's equator (referred to as the "celestial equator") and ±90° are the projections of the axis about which the Earth rotates (referred to as the "celestial poles"). RA is defined by longitudinal lines (typically referred to as "hour circles"), which intersect the North and South celestial poles. Unlike the earth's lines of longitude, the hour circles of RA remain fixed on the celestial sphere.

RA is normally expressed in hours, minutes and seconds and has a range of $0 \text{ hours} \leq \text{RA} \leq 24 \text{ hours}$, where 1 hour=15°. RA=0 hours has been arbitrarily assigned to be the hour circle coinciding with the projection of the Earth's vernal (spring) equinox on the celestial sphere. RA increases in an eastward direction until it returns to 24 hours at the hour circle coinciding with the projection of the Earth's vernal equinox again.

The Earth is continually rotating about its axis. Consequently, even though celestial coordinates are capable of describing the position of a celestial object in a manner that is independent of the observer location, orientation information relating to the location of the observer on the surface of the earth is still required in order use the celestial coordinates of the object to capture the object in the field of view of a telescope. This orientation information may include a variety of parameters which effectively specify the instantaneous orientation of the observer location (which is moving as the earth rotates) with respect to the celestial coordinate system. Typically, this orientation information includes the latitude of the observer location and the instantaneous sidereal time at the observer location. However, other mathematically equivalent forms of orientation information may also be used for this purpose.

This orientation information, which specifies the instantaneous orientation of the observer location with respect to the celestial coordinate system may also be used to formulate a transformation between the celestial coordinate system and a local alt-az coordinate system at the observer location. Such a transformation may transform the coordinates of a celestial object from the celestial coordinate system to the local alt-az coordinate system and may thereby determine the instantaneous altitude and azimuthal angles (Alt, Az) to which telescope 20 must be oriented about respective axes 18A, 16A of alt-az mount 10 to capture the celestial object in the field of view of telescope 20.

Using this orientation information to compute transformations between celestial and alt-az coordinate systems can be complex and burdensome, particularly for amateur or mathematically unsophisticated telescope users. Consequently, telescope systems having alt-az mounts (like mount 10) have been devised which: allow a user to select a desired celestial object specified in celestial coordinates (or to otherwise input desired celestial coordinates); obtain (through user input or otherwise) suitable orientation information about the particular observation location of the telescope system; use the orientation information to transform the desired celestial coordinates into desired local alt-az coordinates; and automatically configure the alt-az mount (i.e. move telescope about the altitude and azimuthal axes) to orient the telescope toward the desired location alt-az coordinates. These telescope systems may be referred to "go-to" telescope systems, because they automatically compute alt-az coordinates and cause the telescope to "go to" alt-az coordinates corresponding to desired celestial objects/coordinates.

Go-to telescope systems typically incorporate a variety of suitable hardware and software for implementing the go to functionality. By way of non-limiting example, go-to telescope systems can comprise electronic hardware (e.g. user interface components, communications components and/or the like), motors and related motor control hardware (e.g. transmissions or other drive mechanisms for operative connecting motors to the altitude and azimuthal pivot joints, position sensors for the altitude and azimuthal pivot joints, amplifiers and driving circuitry for driving the motors and/or the like), suitably programmed processing hardware (e.g. processors configured to compute the transformations between celestial and alt-az coordinates and to otherwise control the functionality of the go-to system).

Celestial objects viewed through a telescope appear to move through the sky. This apparent movement of celestial objects is principally due to the rotation of the Earth about its axis. There are other factors (e.g. the motion of the Earth around the sun and the motion of an object itself), which cause the object to appear to move through the sky, but these factors are usually very small over the course of an observing session. Accordingly, after locating a desired celestial object, the orientation of a telescope must be continually adjusted in order to maintain the object in the telescope field of view. Continual adjustment of a telescope orientation to maintain a desired celestial object in the telescope field of view is referred to as "tracking" an object.

Tracking a celestial object as is moves through the sky can also be burdensome, particularly for amateur telescope users. Consequently, some go-to telescope systems having alt-az mounts (like mount 10) have been provided with additional control software which provides the ability to automatically track the movement of celestial objects. Such telescope systems may be referred to as "auto-tracking" telescope systems.

Referring again to FIGS. 1A-1D, a problem with prior art alt-az mount 10 is shown in FIG. 1D. For long optical instruments (e.g. telescopes 20), physical interaction between the body of telescope 20 and horizontal arm 12B limits the range of pivotal motion of telescope 20 about altitude axis 18A (oriented into and out of the page in the FIG. 1D view). The dotted outline of telescope 20 in FIG. 1D illustrates these limits, where the body of telescope 20 contacts horizontal arm 12B at location 22A when telescope 20 is pivoted around altitude axis 18A too far in one angular direction and at location 22B when telescope 20 is pivoted around altitude axis 18A too far in the opposing angular direction.

Without risking damage to telescope 20 or mount 10, the potential for contact between telescope 20 and horizontal arm 12B can limit the ability of using mount 10 to view objects that have alt coordinates above an upper limit (alt>$alt_{max}$|$alt_{max}$>0°) or below a lower limit (alt<−$alt_{min}$|$alt_{min}$>0°). These limits can be particularly problematic in the context of go to telescope systems and auto-tracking telescope systems, where a processor controls motors to automatically configure the orientation of telescope 20 and may not have knowledge of the size of telescope 20. If these limits are not set correctly to corresponding to the size of the current telescope 20 on mount 10, then the automatic control of the telescope orientation can cause damage to telescope 20.

There is a general desire to provide alt-az mounts for optical instruments which eliminate or ameliorate this constraint on the altitude adjustment range.

For some applications (e.g. capturing panoramic images where individual images are stitched together or using similar techniques), there is a desire to adjust the position of an optical instrument 20 relative to vertical arm 12A of alt-az mount 10, such that the optical axis 20A of instrument 20 is in the plane of (i.e. coplanar with) the plane of azimuthal axis 16A. This situation can be seen in FIG. 1C, where optical axis 20A of instrument 20 is oriented into and out of the plane of the FIG. 1C page. For particular applications, it might be desirable to adjust the position of optical instrument 20 relative to vertical arm 12A to the position 20' indicated by dotted outline, such that its optical axis 20A' is coplanar with azimuthal axis 16A for any orientation of optical instrument 20 about altitude axis 18A.

Adjustment of the position of optical instrument 20 relative to vertical arm 12A may be accomplished by adjusting the configuration of instrument coupling mechanism 19 and/or adjusting the position of optical instrument 20 relative to instrument coupling mechanism 19. It will be appreciated that the range of adjustability of the position of optical instrument 20 relative to vertical arm 12A is limited by the width of optical instrument 20—i.e. because of the interaction between instrument 20 and the edge or surface of vertical arm 12A, a wider instrument 20 will have a correspondingly lower range of adjustability relative to vertical arm 12A. Ultimately, for a given mount 10 and instrument coupling mechanism 19, some optical instruments 20 may be too wide to adjust to a position where their optical axes 20A are coplanar with azimuthal axis 16A.

There is a general desire to accommodate wide optical instruments on alt-az mounts while permitting the optical axes of the instruments to be coplanar with the azimuthal axis of the mount for any orientation of the instruments about the altitude axis and/or to otherwise maximize the adjustability of the position of optical instruments relative to the vertical arm of alt-az mounts.

BRIEF DESCRIPTION OF THE DRAWINGS

In drawings which depict non-limiting embodiments of the invention:

FIG. 1A is an isometric view of a prior art alt-az mount;

FIG. 1B is an isometric view of the FIG. 1A alt-az mount in use to support telescope tube as part of a prior art telescope system;

FIGS. 1C and 1D are a pair of schematic side elevation views of the FIG. 1A mount and FIG. 1B telescope system;

FIGS. 4A and 4B (collectively, FIG. 4) are a pair of schematic side elevation views of the FIG. 2 alt-az mount showing the mount in use to support an optical device in an inside configuration and an outside configuration respectively;

DETAILED DESCRIPTION

Figure 2A:
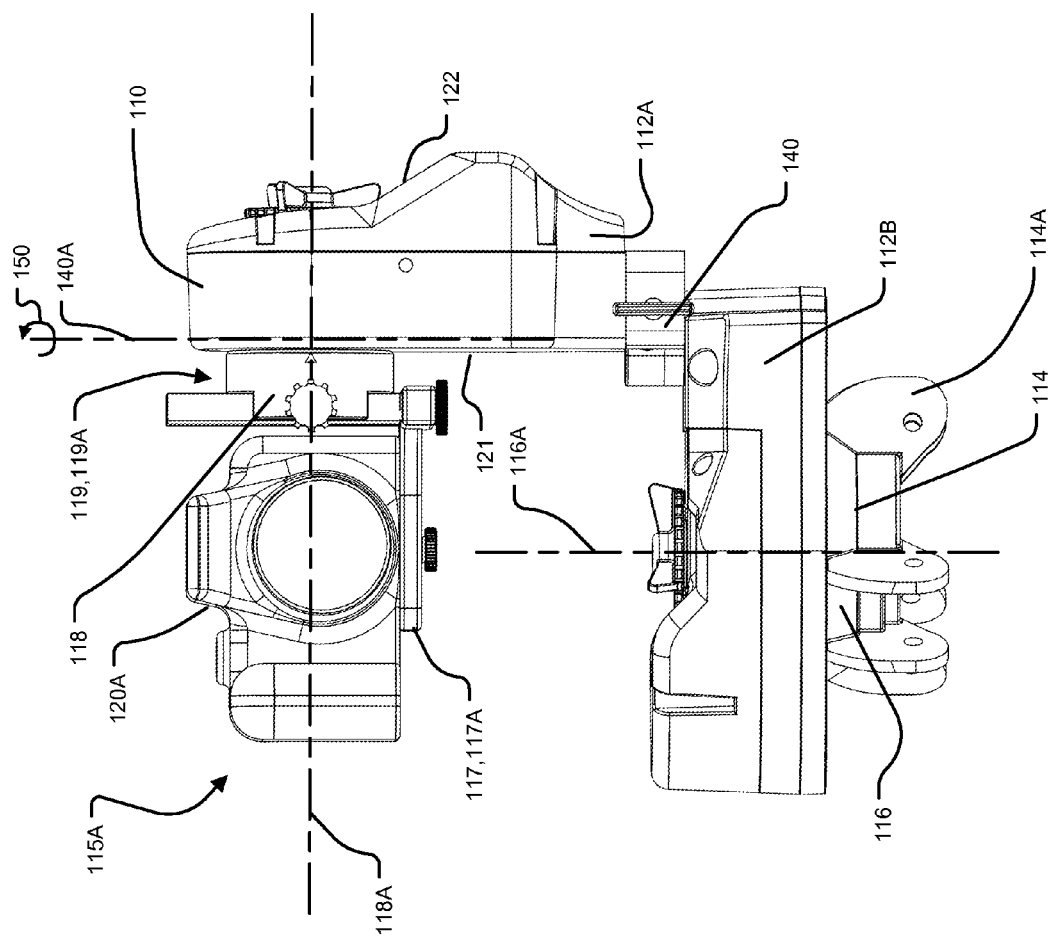
FIGS. 2A-2C (collectively, FIG. 2) are front, side and top elevation views of an alt-az mount according to an example embodiment of the invention in an inside configuration used to support a first optical instrument.
Figure 2B:
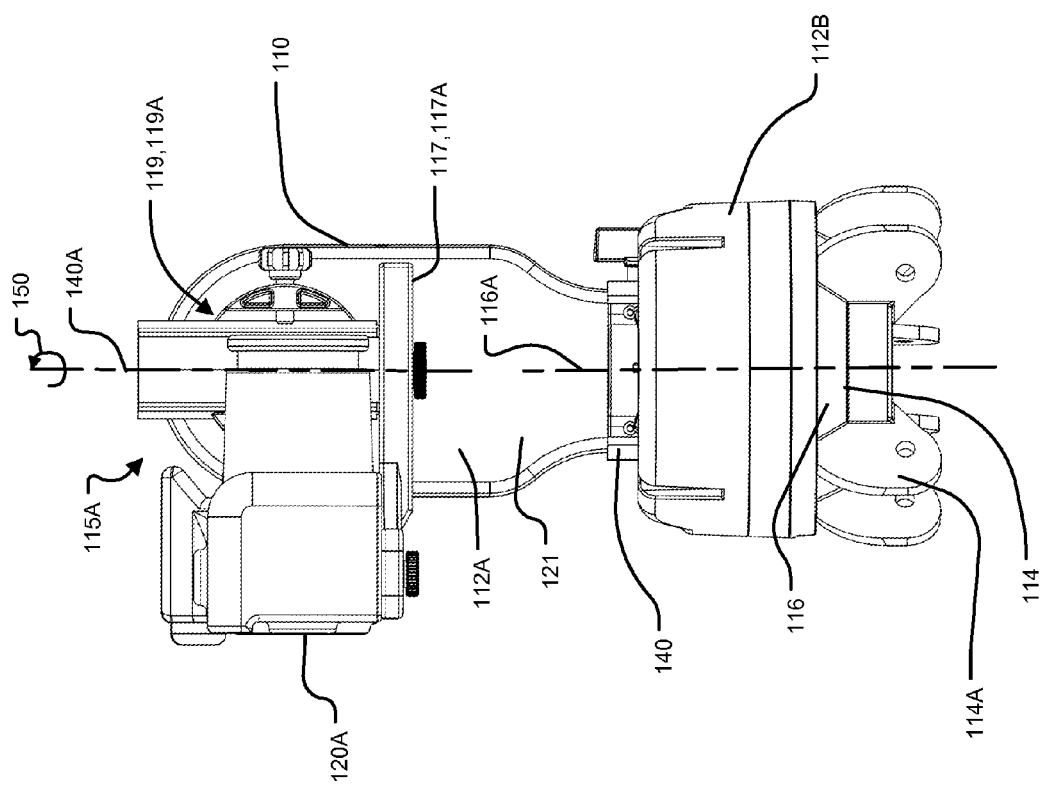
Figure 2C:
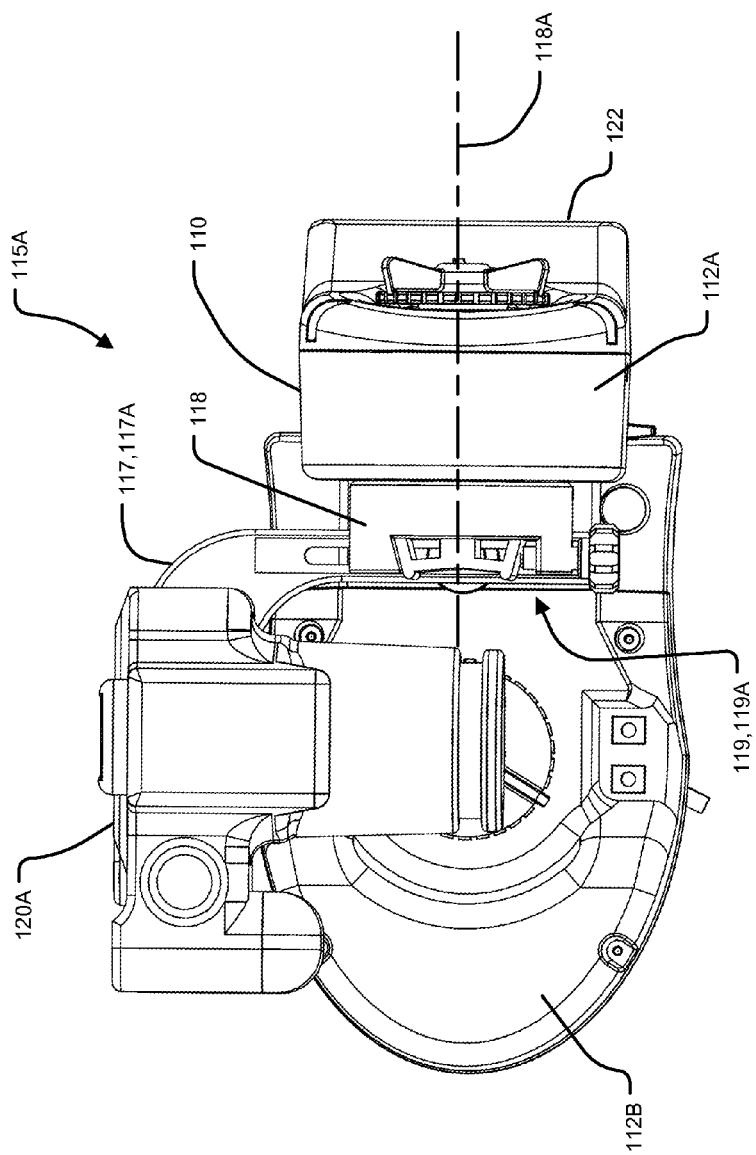
Figure 3A:
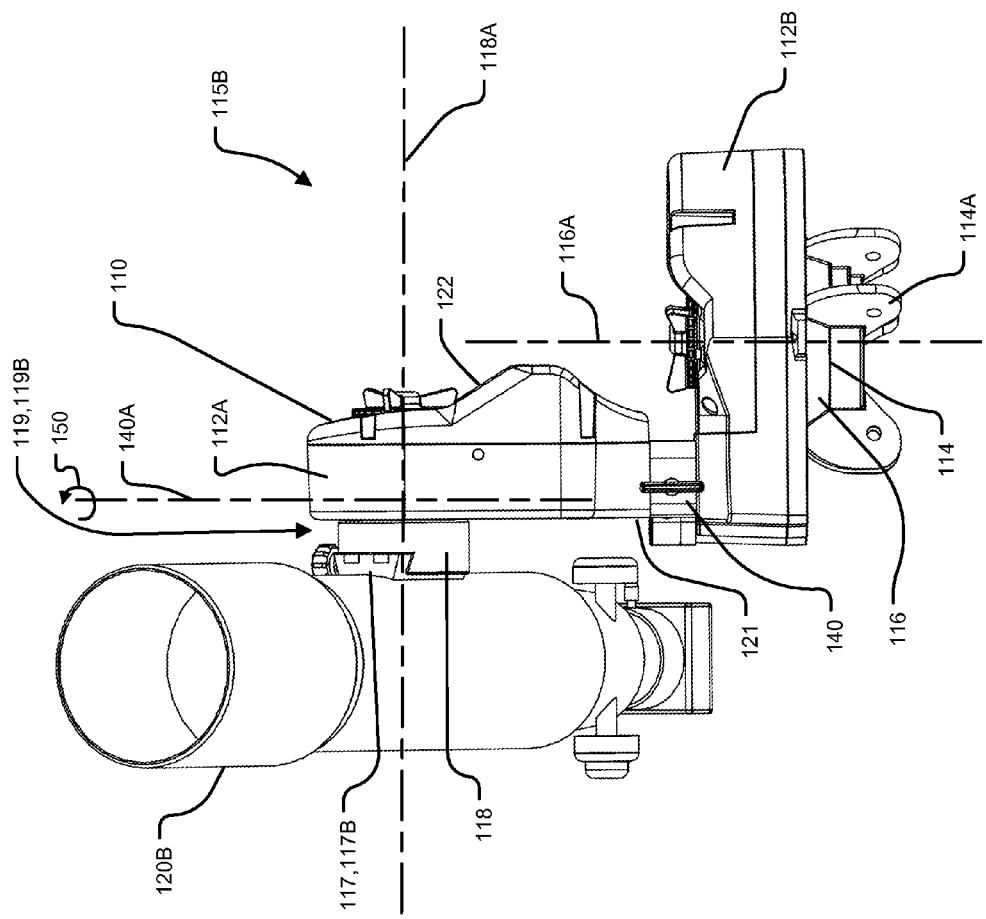
FIGS. 3A-3C (collectively, FIG. 3) are front, side and top elevation views of the FIG. 2 alt-az mount in an outside configuration used to support a second optical instrument.
Figure 3B:
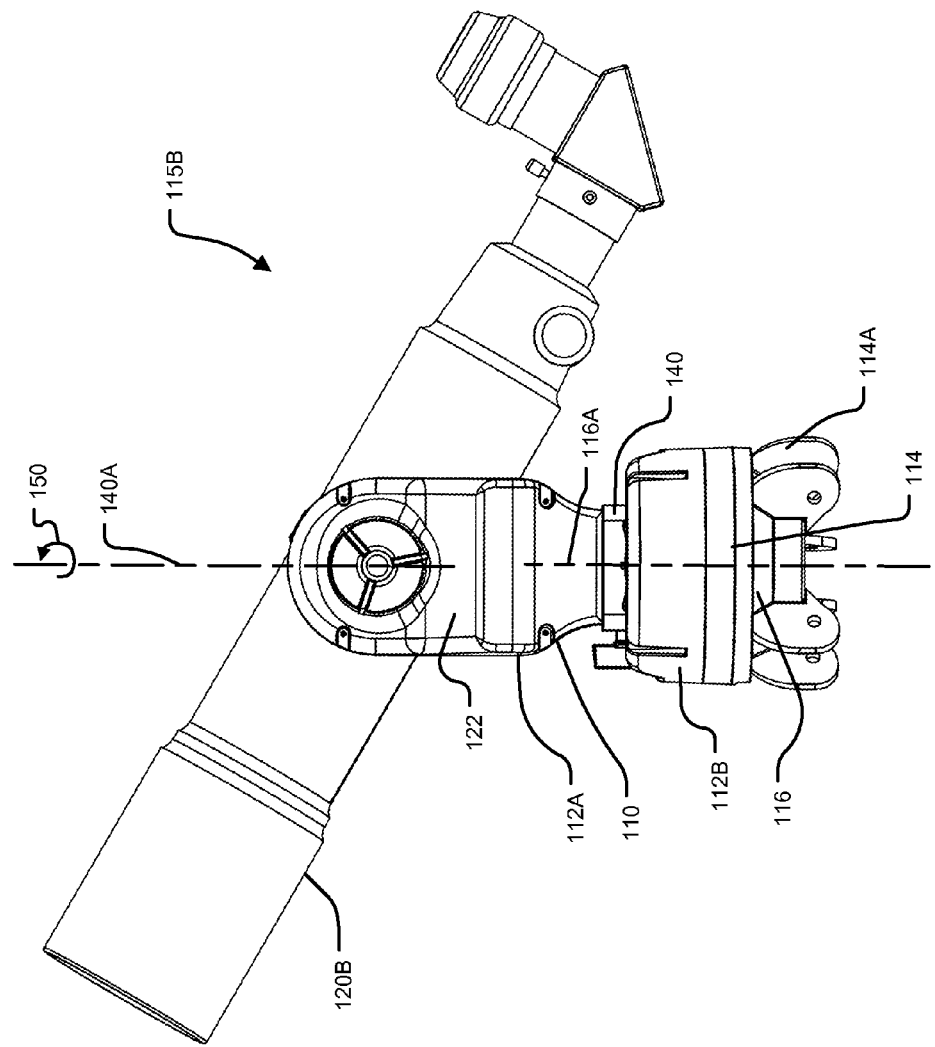
Figure 3C:
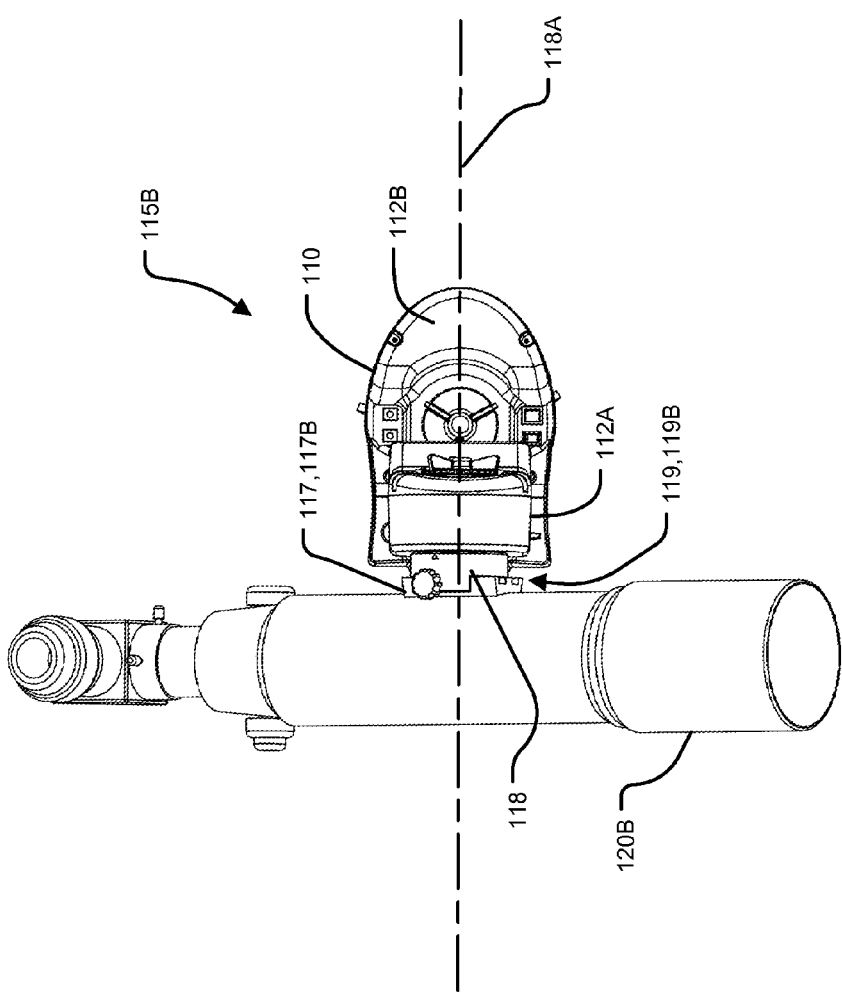

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

One embodiment provides an alt-az mount for supporting and orienting optical instruments which comprises a generally horizontally extending arm coupleable to a level surface by an azimuthal pivot joint which permits pivotal movement of the horizontally extending arm with respect to the level surface about a vertical azimuthal axis; a generally vertically extending arm pivotally coupled to the horizontally extending arm by an inter-arm pivot joint which permits pivotal movement of the vertically extending arm with respect to the horizontally extending arm about a vertical inter-arm axis; and an instrument coupling mechanism for coupling the mount to an optical instrument, the instrument coupling mechanism comprising an altitude pivot joint which permits pivotal movement of the optical instrument with respect to the vertically extending arm about a horizontal altitude axis. The inter-arm pivot joint permits the mount to be adjusted between an inside configuration where the optical instrument and the azimuthal axis are located on the same side of the vertically oriented arm and the inter-arm axis and an outside configuration where the optical instrument and azimuthal axis are located on opposing sides of the vertically oriented arm and the inter-arm axis. The inter-arm pivot joint permits the mount to be adjusted between an inside configuration where a center of the optical instrument (as measured along the altitude axis) is separated from the azimuthal axis by an inside distance and an outside configuration where the center of the optical instrument is separated from the azimuthal axis by an outside distance, the outside distance greater than the inside distance—i.e. in the inside configuration the center of the optical instrument is located relatively close to the azimuthal axis and in the outside configuration the center of the optical instrument is located relatively far from the azimuthal axis.

In some embodiments, the inter-arm axis extends within the vertically oriented arm at a location that is relatively close to an instrument side of the vertically oriented arm associated with the instrument coupling mechanism (i.e. a side of the vertically oriented arm to which the instrument coupling mechanism and any optical instrument are coupled) and relatively far from a second, opposing side of the vertically oriented arm (i.e. a side of the vertically oriented arm opposing the instrument coupling mechanism and any optical instrument mounted thereto). In some embodiments, the inter-arm axis extends within the vertically oriented arm at a location that is relatively close to an instrument edge associated with the instrument side of the vertically oriented arm and relatively far from a second edge associated with the second, opposing side of the vertically oriented arm. The instrument side and the second, opposing side and/or the instrument and second edges may be defined along the altitude axis of the mount.

One embodiment provides a method for controlling an optical instrument system comprising an alt-az mount. The method comprises providing an alt-az mount for supporting and orienting optical instruments which comprises a generally horizontally extending arm coupleable to a level surface by an azimuthal pivot joint which permits pivotal movement of the horizontally extending arm with respect to the level surface about a vertical azimuthal axis; a generally vertically extending arm pivotally coupled to the horizontally extending arm by an inter-arm pivot joint which permits pivotal movement of the vertically extending arm with respect to the horizontally extending arm about a vertical inter-arm axis; and an instrument coupling mechanism for coupling the mount to an optical instrument, the instrument coupling mechanism comprising an altitude pivot joint which permits pivotal movement of the optical instrument with respect to the vertically extending arm about a horizontal altitude axis. The inter-arm pivot joint permits the mount to be adjusted between an inside configuration where the optical instrument and the azimuthal axis are located on the same side of the vertically oriented arm and the inter-arm axis and an outside configuration where the optical instrument and azimuthal axis are located on opposing sides of the vertically oriented arm and the inter-arm axis. The method also comprises establishing inside altitude axis limits $\{alt_{min\_in}, alt_{max\_in} | alt_{min\_in} > 0, alt_{max\_in} > 0\}$ on the movement of the altitude pivot joint when the mount is in the inside configuration such that an altitude angle (alt) is limited to a range $-alt_{min\_in} \leq alt \leq alt_{max\_in}$ when the mount is in the inside configuration; establishing outside altitude axis limits $\{alt_{min\_out}, alt_{max\_out} | alt_{min\_out} > 0, alt_{max\_out} > 0\}$ on the movement of the altitude pivot joint when the mount is in the outside configuration such that the altitude angle (alt) is limited to a range $-alt_{min\_out} \leq alt \leq alt_{max\_out}$ when the mount is in the outside configuration, where $alt_{min\_out} \leq alt_{min\_in}$ and $alt_{max\_out} > alt_{max\_in}$; and determining whether the mount is in the inside configuration or the outside configuration to thereby adjust between the first limits and the second limits.

Determining whether the mount is in the inside configuration or the outside configuration may comprise receiving user input indicative of the inside or outside configuration or may comprise automatically detecting the inside or outside configuration. Automatically detecting the inside or outside configuration may comprise detecting a signal from a switch, from one or more sensors, from one or more detectors or the like. In some embodiments, the outside altitude axis limits $\{alt_{min\_out}, alt_{max\_out} | alt_{min\_out} > 0, alt_{max\_out} > 0\}$ when the mount is in the outside configuration may span the entire range of possible altitude angles—i.e. such that there is effectively no limit on the altitude angle when the mount is in its outside configuration.

Another embodiment provides a method for controlling an optical instrument system comprising an alt-az mount. The method comprises providing an alt-az mount for supporting and orienting optical instruments which comprises a generally horizontally extending arm coupleable to a level surface by an azimuthal pivot joint which permits pivotal movement of the horizontally extending arm with respect to the level surface about a vertical azimuthal axis; a generally vertically extending arm pivotally coupled to the horizontally extending arm by an inter-arm pivot joint which permits pivotal movement of the vertically extending arm with respect to the horizontally extending arm about a vertical inter-arm axis; and an instrument coupling mechanism for coupling the mount to an optical instrument, the instrument coupling mechanism comprising an altitude pivot joint which permits pivotal movement of the optical instrument with respect to the vertically extending arm about a horizontal altitude axis. The inter-arm pivot joint permits the mount to be adjusted between an inside configuration where the optical instrument and the azimuthal axis are located on the same side of the vertically oriented arm and the inter-arm axis and an outside configuration where the optical instrument and azimuthal axis are located on opposing sides of the vertically oriented arm and the inter-arm axis. The method also comprises maintaining an altitude coordinate (alt) which is representative of the angular orientation of the altitude pivot joint about the altitude axis with a first polarity when the mount is in the inside configuration and maintaining the altitude coordinate (alt) with a second, opposing polarity when the mount is in the outside configuration; and determining whether the mount is in the inside configuration or the outside configuration to thereby adjust the polarity of the altitude coordinate (alt).

Maintaining the altitude coordinate (alt) with the second, opposing polarity may involve negating the altitude coordinate and interpreting movement of the altitude pivot joint in a particular angular direction to have an opposite effect on the altitude coordinate (alt) as compared to when the mount is in the inside configuration.

The methods may be implemented by a suitably programmed processor.

FIGS. 2-5 show various views of an alt-az mount 110 according to a particular embodiment in use to support a variety of optical instruments 120A, 120B, 120C, 120D (collectively, optical instruments 120) as a part of optical instrument systems 115A, 115B, 115C, 115D (collectively, optical instrument systems 115). As explained in more detail below, mount 110 is switchable between: an inside configuration (FIG. 2, FIG. 4A and FIG. 5) where optical instruments 120A, 120C, 120D and azimuthal axis 116A are located on the same side of vertically extending arm 112A; and an outside configuration (FIG. 3 and FIG. 4B) where optical instruments 120B, 120C and azimuthal axis 116A are located on opposite sides of vertically extending arm 112A. In other words, mount 110 is adjustable between an inside configuration (FIG. 2, FIG. 4A and FIG. 5) where a center of optical instrument 120A, 120C, 120D (as measured along altitude axis 118A) is separated from azimuthal axis 116A by an inside distance and an outside configuration (FIG. 3 and FIG. 4B) where the center of optical instrument 120B, 120C is separated from azimuthal axis 116A by an outside distance, the outside distance greater than the inside distance. The outside configuration of mount 110 permits a greater range of adjustment of optical instruments 120 about altitude axis 118A.

As explained in more detail below, vertically extending arm 112A is coupled to horizontally extending arm 112B via an inter-arm pivot joint 140 which permits pivotal movement of vertically extending arm 112A with respect to horizontally extending arm 112B about a generally vertical inter-arm axis 140A. Inter-arm axis 140A may extend within the vertically oriented arm 112A at a location that is relatively close to an instrument side 121 of vertically oriented arm 112A associated with instrument coupling mechanism 119 (i.e. a side 121 of vertically oriented arm 112A to which instrument coupling mechanism 119 and optical instruments 120 are coupled) and relatively far from a second, opposing side 122 of vertically oriented arm 112A (i.e. a side 122 of vertically oriented arm 112A opposing instrument coupling mechanism 119 and optical instruments 120).

Referring to FIGS. 2-5, mount 110 comprises a generally vertically oriented arm 112A and a generally horizontally oriented arm 112B. Horizontally extending arm 112B is coupled to a level surface 114 via an azimuthal pivot joint 116. In optical instrument systems 115 of the illustrated embodiments, level surface 114 is provided by a tripod 114A or similar leveling system. Only a portion of tripod 114A is shown in the illustrated views. Tripod 114A ensures that level surface 114 (and consequently horizontally oriented arm 112B) are generally horizontally oriented and vertically oriented arm 112A is generally vertically oriented. It will be appreciated by those skilled in the art, that there are a wide variety of systems and devices capable of providing a generally level surface 114. Mounts according to various embodiments of the invention can be used with any suitable systems and/or devices for providing level surface 114. When coupled to level surface 114, azimuthal pivot joint 116 coupled between level surface 114 and horizontally oriented arm 112B permits pivotal movement of mount 110 relative to level surface 114 about a generally vertically oriented azimuthal axis 116A.

Mount 110 also comprises an instrument coupling mechanism 119 by which optical instruments 120 are coupled to an instrument side 121 of vertically oriented arm 112A. Instrument coupling mechanism 119 of the illustrated embodiment comprises: one or more instrument-engaging components 117 which fixedly engage optical instruments 120 (i.e. which move with optical instruments 120); and an altitude pivot joint 118 coupled between instrument-engaging component(s) 117 and instrument side 121 (and/or a corresponding edge or surface of instrument side 121) of vertically oriented arm 112A. Altitude pivot joint 118 permits pivotal movement of instrument-engaging component(s) 117 and optical instruments 120 relative to vertically oriented arm 112A about a generally horizontally oriented altitude axis 118A.

Instrument-engaging components 117 of instrument coupling mechanism 119 can take a wide variety of forms, depending on the particulars of the mechanism used to couple to optical instruments 120. In the illustrated embodiments of FIGS. 2 and 5, optical instruments 120A, 120D are cameras and instrument coupling mechanisms 119A, 119D comprise "L-shaped" instrument-engaging components 117A, 117D which are coupled to and support the undersides of optical instruments 120A, 120D. In the illustrated embodiments of FIGS. 3 and 4, optical instruments 120B, 120C comprise telescope tubes and instrument coupling mechanisms 119B, 119C comprise "bar-shaped" instrument-engaging components 117B, 117C which extend axially along and which are coupled to the bodies of the telescope tubes. Instrument-engaging components 117 may use a wide variety of techniques to couple to optical instruments 120. By way of non-limiting example, such techniques may comprise screw-based connection mechanisms, tongue and groove-based connection mechanisms, deformable (e.g. snap together) connection mechanisms and/or the like.

In contrast to prior art mount 10, mount 110 comprise an inter-arm pivot joint 140 coupled between vertically oriented arm 112A and horizontally oriented arm 112B. Inter-arm pivot joint 140 permits pivotal movement of vertical arm 112A relative to horizontal arm 112B about inter-arm axis 140A. By pivoting vertically extending arm 112A relative to horizontally extending arm 112B about inter-arm axis (see arrow 150), a configuration of mount 110 can be changed between: an inside configuration (FIG. 2, FIG. 4A and FIG. 5) where optical instruments 120A, 120C, 120D and azimuthal axis 116A are located on the same side of vertically extending arm 112A; and an outside configuration (FIG. 3 and FIG. 4B) where optical instruments 120B, 120C and azimuthal axis 116A are located on opposite sides of vertically extending arm 112A. In other words, mount 110 is adjustable between an inside configuration (FIG. 2, FIG. 4A and FIG. 5) where a center of optical instrument 120A, 120C, 120D (as measured along altitude axis 118A) is separated from azimuthal axis 116A by an inside distance and an outside configuration (FIG. 3 and FIG. 4B) where the center of optical instrument 120B, 120C is separated from azimuthal axis 116A by an outside distance, the outside distance greater than the inside distance.

The outside configuration of mount 110 (FIG. 3 and FIG. 4B) permits a greater range of adjustment of optical instruments 120 about altitude axis 118A. More particularly, in the illustrated embodiment when inter-arm pivot joint 140 is adjusted such that mount 110 is in its outside configuration, optical instruments 120 mounted to instrument coupling mechanism 119 are free to move about altitude axis uninhibited by contact with horizontally extending arm 112B. In the illustrated embodiment, when inter-arm pivot joint 140 is adjusted such that mount 110 is in its outside configuration, altitude pivot joint 118 is moveable through 360° without fear that optical instruments 120 will contact horizontally extending arm 112B.

Mount 110 may be provided as a go-to mount and/or an auto-tracking mount and may comprise a variety of suitable hardware and software (not explicitly shown) for implementing the go-to and/or auto-tracking functionality. By way of non-limiting example, go-to telescope systems can comprise electronic hardware (e.g. user interface components, communications components and/or the like), motors and related motor control hardware (e.g. transmissions or other drive mechanisms for operatively connecting motors to altitude and azimuthal pivot joints 118, 116, position sensors for the altitude and azimuthal pivot joints 118, 116, amplifiers and driving circuitry for driving the motors and/or the like), suitably programmed processing hardware (e.g. processors configured to compute the transformations between celestial and alt-az coordinates and to otherwise control the functionality of the go-to and/or auto-tracking system).

In addition to the hardware and software known in the art for conventional go-to and auto-tracking instrument mounts, mount 110 may comprise suitable hardware and software for operation of inter-arm pivot joint 140. For example, in some embodiments, mount 110 comprises suitable hardware and software for autonomous operation of inter-arm pivot joint 140. By way of non-limiting example, such hardware and software may include one or more motors and related motor control hardware for control of inter-arm pivot joint 140 (e.g. similar to that discussed above altitude and azimuthal pivot joints 118, 116), and processors configured with suitable software for control of inter-arm pivot joint 140 and for control of the rest of mount 110 based on the configuration of inter-arm pivot joint 140.

Figure 6:
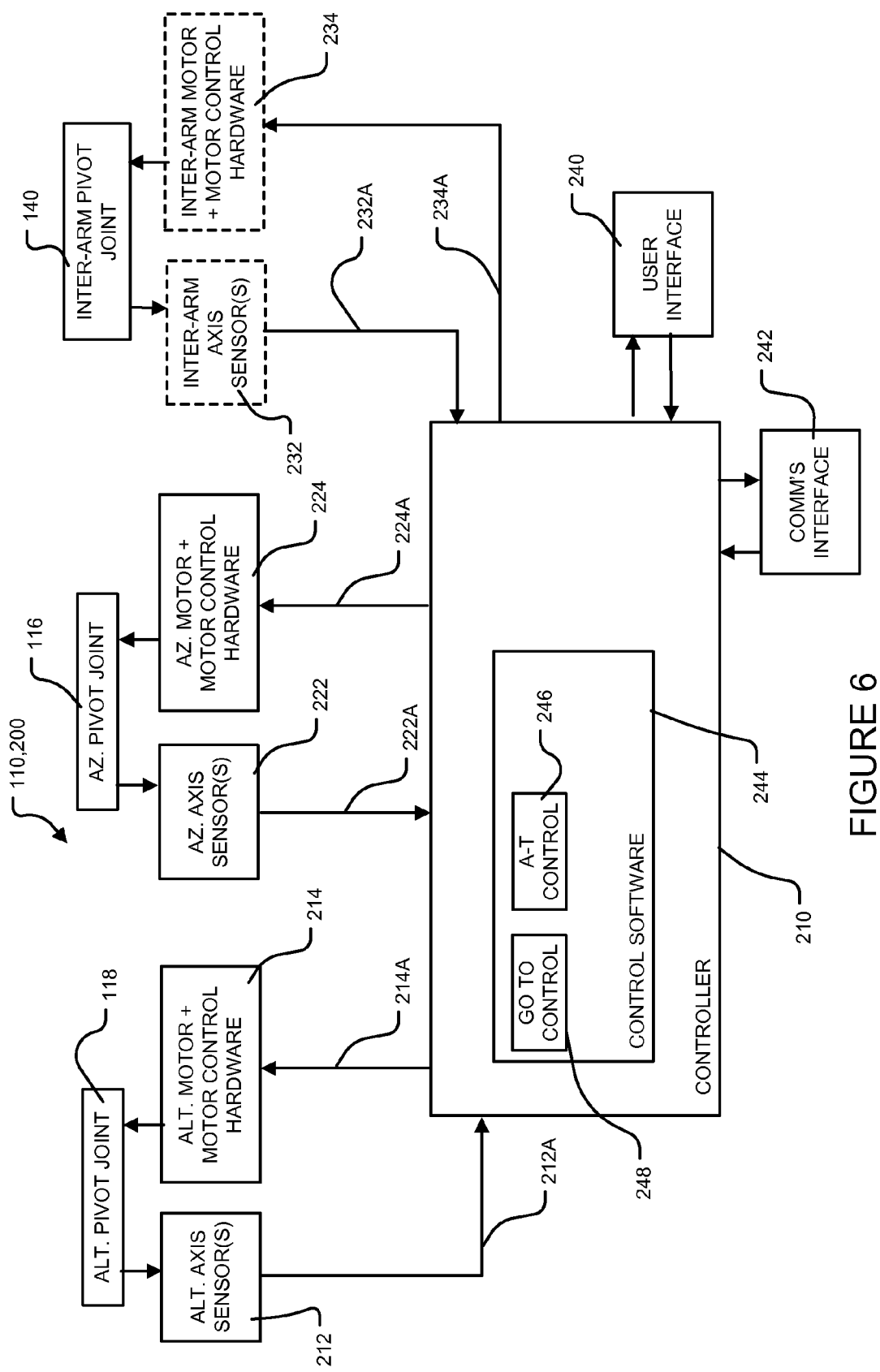
FIG. 6 is a schematic block diagram representation of an operational system for the FIG. 2 alt-az mount according to a particular embodiment.

FIG. 6 is a schematic, block diagram illustration representing an operational system 200 for providing alt-az mount 110 with go-to and auto-tracking functionality according to a particular embodiment. Operational system 200 shown in the FIG. 6 illustration is schematic in nature and some components are omitted for clarity. Such components will be understood by those skilled in the art in view of the remaining disclosure presented herewith. Operational system 200 may be implemented and/or controlled by controller 210. Controller 210 may comprise one or more suitably programmed data processors, software running on one or more personal computers, suitably configured programmable logic arrays or the like. Controller 210 is suitably configured to operate control software 244 which, in the illustrated embodiment, comprises auto-tracking control software 246 and go-to control software 248. It will be appreciated that the schematic depiction of auto-tracking control software 246 and go-to control software 248 as distinct from one another is notional only and that auto-tracking control software 246 and go-to control software 248 may be implemented in part or in whole by the same code. Controller 210 may comprise or may have access to memory (not explicitly shown) which may be used to store control software 244, other useful software (e.g. communications software, user interface software and/or the like), and useful data (e.g. a database of celestial objects and their corresponding celestial coordinates and/or the like).

Controller 210 may communicate with a user and/or with other external systems (e.g. computers, networks or the like) via user interface 240 and/or communications interface 242. Such communications may be wired or wireless. User interface 240 may be implemented as a graphical user interface 240 comprising an output display and one or more user inputs. Communications interface 242 is preferably implemented according to one or more standardized communications protocols.

Operational system 200 comprises one or more altitude axis sensors 212 which provide a signal 212A indicative of the altitude coordinate of altitude pivot joint 118. In one particular embodiment, altitude axis sensors 212 may be implemented using a dual-encoder system as described, for example, in U.S. Pat. No. 7,228,253 which is hereby incorporated herein by reference. Operational system 200 also comprises one or more altitude motors and corresponding altitude motor control hardware 214. When controller 210 operates control software 244, it receives signal 212A indicative of the current altitude coordinate of altitude pivot joint 118 from altitude axis sensors 212 and outputs a corresponding signal 214A to altitude motor(s) and motor control hardware 214 which causes altitude motor(s) and motor control hardware 214 to adjust altitude axis 118 as desired by control software 244.

Operational system 200 comprises one or more azimuthal axis sensors 222 and one or more azimuthal motors and corresponding azimuthal motor control hardware 224. Azimuthal sensors 222, azimuthal motor(s) and azimuthal motor control hardware 224 may be similar to altitude sensors 212, altitude motor(s) and altitude motor control hardware 214, except that azimuthal sensors 222 output a signal 222A indicative of the azimuthal coordinate of azimuthal axis 116 and controller 210 outputs a corresponding signal 224A to azimuthal motor(s) and motor control hardware 224 that causes azimuthal motor(s) and motor control hardware 224 to adjust azimuthal axis 116 as desired by control software 244.

In the illustrated embodiment, operational system 200 also comprises one or more optional inter-arm axis sensors 232 and one or more optional inter-arm axis motors and corresponding inter-arm axis motor control hardware 234. Both inter-arm axis sensors 232 and inter-arm axis motors and corresponding inter-arm axis motor control hardware 234 are optional (as indicated by the dashed lines) and each may be independently include or excluded from operational system 200. In general, inter-arm axis sensors 232 provide a signal 232A indicative of an angular orientation of inter-arm pivot joint 140 (i.e. indicative of an angular orientation of vertically extending arm 112A about inter-arm axis 140A). In some embodiments, inter-arm axis sensors 232 may comprise one or more encoders indicative of the precise angular orientation of inter-arm pivot joint 140. Such encoders may be implemented using a dual-encoder system as described, for example, in U.S. Pat. No. 7,228,253. In other embodiments, inter-arm axis sensors 232 may comprise an automatically activated switch whose output signal 232A is indicative of whether mount 110 is in its inside or outside configuration. In still other embodiments, inter-arm axis sensors 232 are not required and a user may indicate whether mount 110 is in its inside or outside configuration via user interface 240 or by a dedicated input (not shown).

Controller 210 may control the angular orientation of inter-arm pivot joint 140 using signal 234A which is provided to inter-arm axis motor(s) and motor control hardware 234. In some embodiments, inter-arm pivot joint control signal signal 234A may be responsive to user input via user interface 240 and/or communications interface 242. In other embodiments, inter-arm axis motor(s) and motor control hardware 234 are not required and a user may manually move inter-arm pivot joint 140 (i.e. may manually move vertically extending arm 112A relative to horizontally extending arm 112B) about inter-arm pivot axis 140A.

In some embodiments, where mount 110 is a go-to mount and/or an auto-tracking mount, controller 210 may make use of inside altitude axis limits $\{alt_{min\_in}, alt_{max\_in} | alt_{min\_in} > 0, alt_{max\_in} > 0\}$ which confine the angular range of altitude pivot joint 118 to altitude angles (alt) in a range $-alt_{min\_in} \leq alt \leq alt_{max\_in}$ when mount 110 is in the inside configuration and may make use of outside altitude axis limits $\{alt_{min\_out}, alt_{max\_out} | alt_{min\_out} > 0, alt_{max\_out} > 0\}$ which confine the angular range of altitude pivot joint 118 to altitude angles (alt) in a range $-alt_{min\_out} \leq alt \leq alt_{max\_out}$ when the mount is in the outside configuration. As explained above, when mount 110 is in its outside configuration, mount 110 may provide a greater range of adjustment of optical instruments 120 about altitude axis 118A—i.e. $alt_{min\_out} > alt_{min\_in}$ and $alt_{max\_out} > alt_{max\_in}$. In some embodiments, the outside altitude axis limits $\{alt_{min\_out}, alt_{max\_out}\}$ when the mount is in the outside configuration may span the entire range of possible altitude angles—i.e. such that there is effectively no limit on the altitude angle when the mount is in its outside configuration.

In some embodiments, the inside altitude axis limits $\{alt_{min\_in}, alt_{max\_in}\}$ and/or the outside altitude axis limits $\{alt_{min\_out}, alt_{max\_out}\}$ may be user-configurable. For example, a user could input the inside altitude axis limits $\{alt_{min\_in}, alt_{max\_in}\}$ and/or the outside altitude axis $\{alt_{min\_out}, alt_{max\_out}\}$ to controller 210 through user interface 240 and/or communications interface 242. In some embodiments, the inside altitude axis limits $\{alt_{min\_in}, alt_{max\_in}\}$ and/or the outside altitude axis limits $\{alt_{min\_out}, alt_{max\_out}\}$ may be pre-set by controller 210. In some embodiments, the inside altitude axis limits $\{alt_{min\_in}, alt_{max\_in}\}$ and/or the outside altitude axis limits $\{alt_{min\_out}, alt_{max\_out}\}$ may be determined in a calibration procedure. Such a calibration procedure may involve determining when optical device 120 supported by mount 110 contacts horizontally extending arm 112B.

In some embodiments, mount 110 may be configured to automatically detect or otherwise determine (e.g. by user input) when it is in its inside configuration or its outside configuration and to adjust between the inside and outside altitude axis limits accordingly. In particular embodiments, mount 110 may incorporate inter-arm sensor 232 (e.g. a switch or some other sensor or detector) that is switched, triggered or otherwise provides an indication (e.g. signal 232A) to controller 210 that mount 110 is in its inside or outside configuration. By way of non-limiting example, inter-arm sensor 232 may be implemented as a mechanical or optical switch that, when depressed or otherwise activated, indicates to controller 210 via signal 232A that mount 110 is in is inside configuration and, when not depressed or not otherwise activated, indicates to controller 210 via signal 232A that mount 110 is in its outside configuration. In some embodiments, a user may indicate to controller 210 that mount 110 is in its inside configuration or its outside configuration via user interface 240 and/or communication interface 242.

Figure 7:
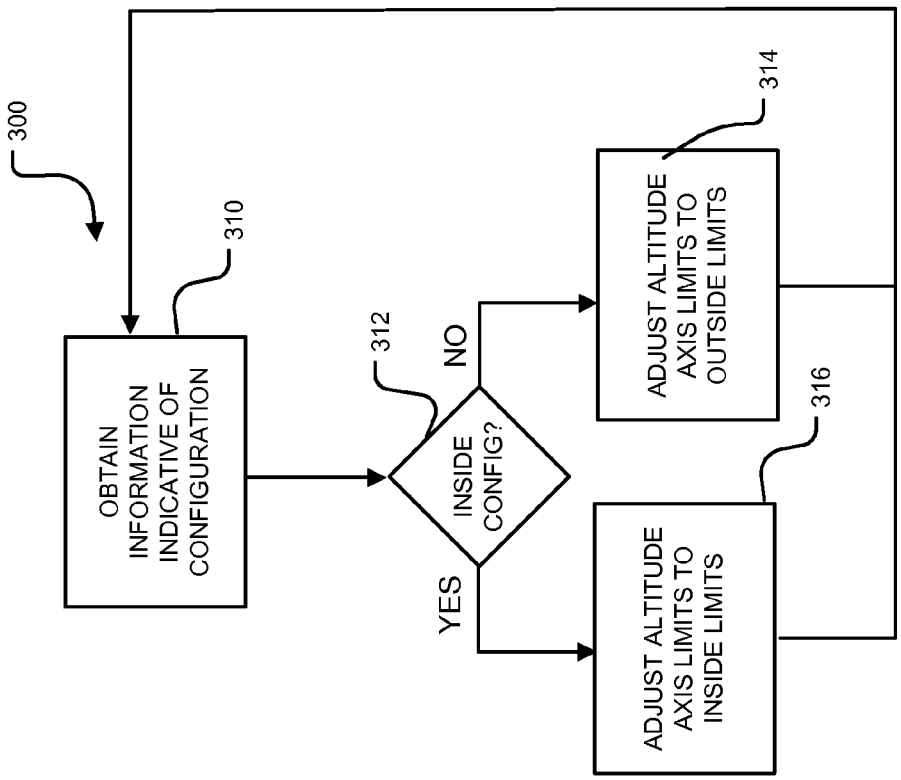
FIG. 7 is a schematic block diagram representation of a method for controlling the movement of a go-to and/or auto-tracking mount according to a particular embodiment of the invention.

FIG. 7 illustrates a method 300 according to a particular embodiment of the invention. Method 300 may be implemented by controller 210 of operational system 200 of mount 110. In the illustrated embodiment, method 300 commences in block 310 which involves obtaining information indicative of whether mount 110 is in its inside configuration or its outside configuration. As discussed above, such block 310 configuration information can be determined automatically by controller 210 (e.g. via and indication from a suitable inter-arm axis switch, sensor or detector 232) or by user input via user interface 240 and/or communications interface 242. Method 300 then proceeds to block 312 which involves an inquiry into whether mount 110 is in its inside configuration based on the block 310 configuration information. If the block 312 inquiry is positive (i.e. mount 110 is in its inside configuration), then method 300 proceeds to block 316 where controller 210 adopts the inside altitude axis limits $\{alt_{min\_in}, alt_{max\_in}\}$ for the purposes of implementing control software 244 before looping back to block 310. If the block 312 inquiry is negative (i.e. mount 110 is in its outside configuration), then method 300 proceeds to block 314 where controller 210 adopts the outside altitude axis limits $\{alt_{min\_out}, alt_{max\_out}\}$ for the purposes of implementing control software 244 before looping back to block 310.

In some embodiments (e.g. where mount 110 is a go-to mount and/or an auto-tracking mount), controller 210 may make use of altitude coordinate (alt) which is representative of the orientation of optical instrument 120 (or altitude pivot joint 118) about altitude axis 118A. Such altitude coordinate may be an internal coordinate (e.g. used by controller 210 and unknown to the user) and/or may be displayed to or otherwise known to the user. In some embodiments, controller 210 is configured to invert the polarity of the altitude coordinate depending on whether mount 110 is in its inside configuration or its outside configuration. Such a reversal of polarity may involve negating the altitude coordinate (e.g. multiplying the altitude coordinate by −1 or otherwise making a positive altitude coordinate negative or a negative altitude coordinate positive) and may also involve interpreting movement of altitude pivot joint 118 to have an opposing effect on the altitude coordinate (e.g. movement of altitude pivot joint 118 in a particular angular orientation may increase the altitude coordinate when mount 110 is in its inside configuration, but may decrease the altitude coordinate when mount 110 is in its outside configuration and vice versa for movement of altitude pivot joint 118 in the opposing angular direction). Interpreting movement of altitude pivot joint 118 in a particular angular orientation may involve controller interpreting signal 212A in a different manner (e.g. a negative or opposite manner) in response to a determination of whether mount 110 is in its inside configuration or its outside configuration.

Figure 8:
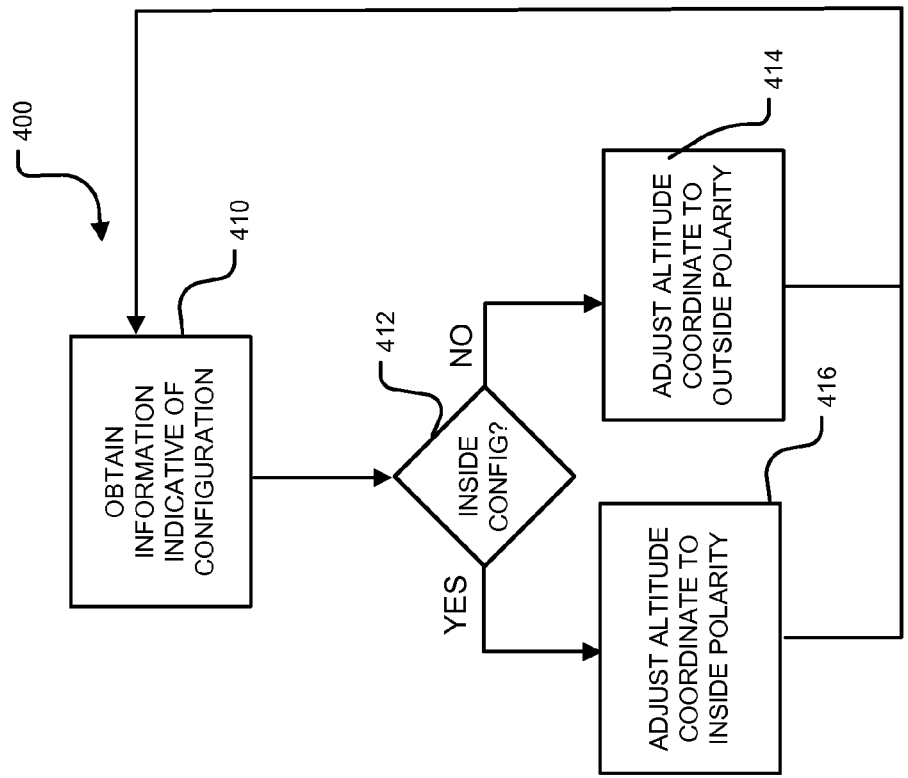
FIG. 8 is a schematic block diagram representation of a method for controlling the movement of a go-to and/or auto-tracking mount according to a particular embodiment of the invention.

FIG. 8 illustrates a method 400 according to a particular embodiment of the invention. Method 400 may be implemented by controller 210 of operational system 200 of mount 110. Blocks 4120 and 412 of method 400 are substantially similar to blocks 310 and 312 of method 300 described above. If the block 412 inquiry is positive (i.e. mount 110 is in its inside configuration), then method 300 proceeds to block 416 where controller 210 adopts the inside polarity for the altitude coordinate before looping back to block 410. If the block 412 inquiry is negative (i.e. mount 110 is in its outside configuration), then method 400 proceeds to block 414 where controller 210 adopts the outside polarity for the altitude coordinate before looping back to block 410.

Figure 5:
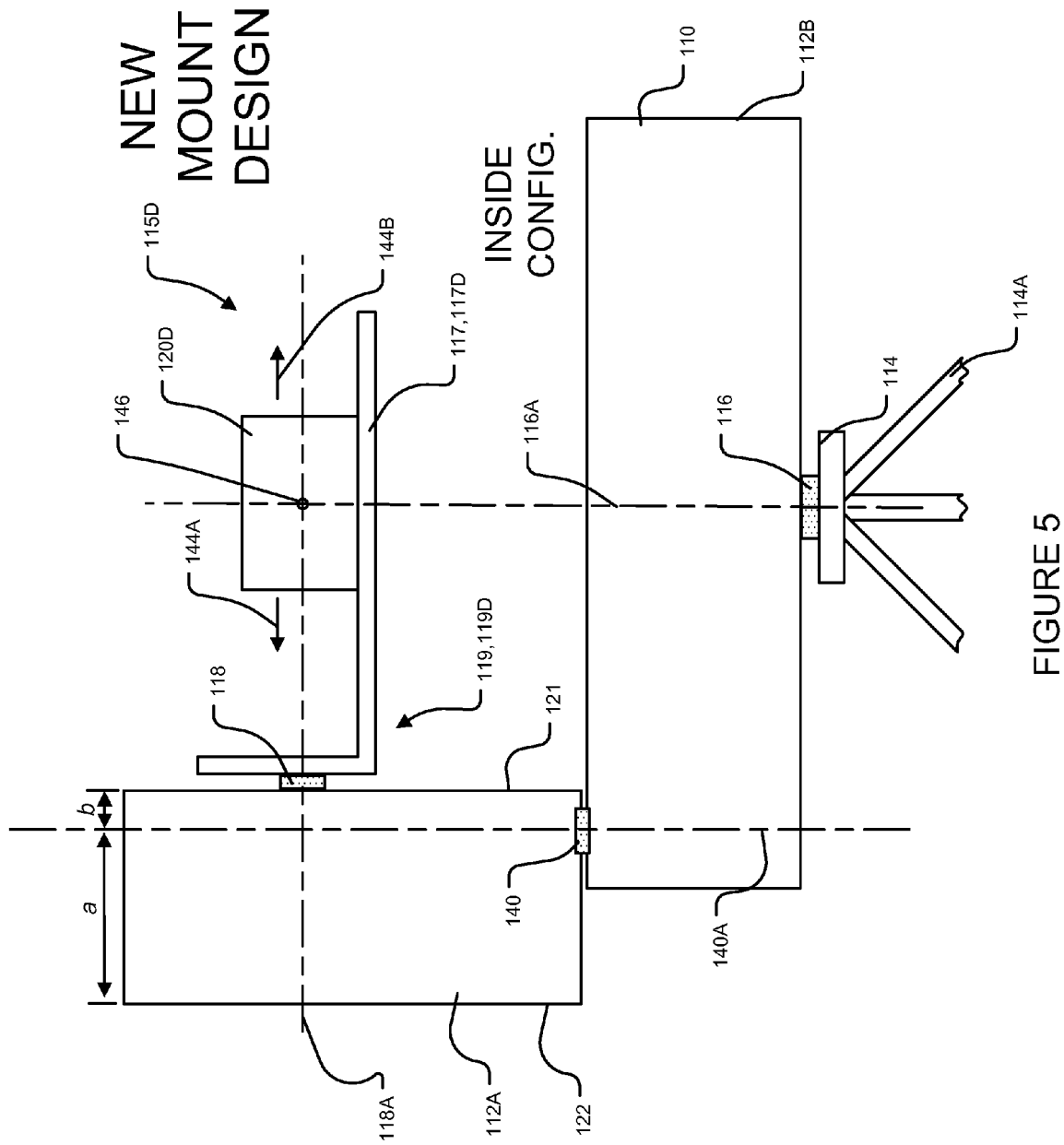
FIG. 5 is a another schematic side elevation view of the FIG. 2 alt-az mount in use in an inside configuration to support an optical device.

Another aspect of mount 110 of the illustrated embodiment is shown best in FIG. 5, where it may be observed that inter-arm axis 140A is located within vertically oriented arm 112A at a location that is relatively close to instrument side 121 of vertically oriented arm 112A (i.e. a side 121 of vertically oriented arm 112A to which instrument coupling mechanism 119 and any optical instrument 120 are coupled) and relatively far from a second, opposing side 122 of vertically oriented arm 112A (i.e. a side 122 of vertically oriented arm 112A opposing instrument coupling mechanism 119 and any optical instrument 120 coupled thereto). In some embodiments, inter-arm axis 140A extends within vertically oriented arm 112A at a location that is relatively close to an instrument edge associated with instrument side 121 of vertically oriented arm 112A and relatively far from a second edge associated with second, opposing side 122 of vertically oriented arm 112A. Instrument side 121 and second, opposing side 122 and/or the instrument and second edges may be defined along the altitude axis 118A of mount 110.

In the illustrated embodiment shown in FIG. 5, the distance between inter-arm axis 140A and instrument side 121 of vertically oriented arm 112A as measured along altitude axis 118A is shown as band the distance between inter-arm axis 140A and second, opposing side 122 of vertically oriented arm 112A as measured along altitude axis 118A is shown as a. As is clear from FIG. 5, a>b. Advantageously, for a given dimension of vertically oriented arm 112A (e.g. which may be necessary for housing mechanical and/or electrical components associated with mount 110), this asymmetrical location of inter-arm axis 140A relative to sides 121, 122 of vertically oriented arm 112A (i.e. a>b) provides a greater range of motion to move optical instrument 120D in directions 144A, 144B (relative to vertically oriented arm 112A) when compared to a symmetrical location of inter-arm axis 140A relative to sides 121, 122 (i.e. a=b). It will be observed from FIG. 5 that the range of movement of optical instrument 120D in direction 144A is limited by the width of optical instrument 120D. Accordingly, the greater range of movement of optical instrument 120D in direction 144A provides a correspondingly greater range of movement to align optical axis 146 of optical instrument 120D to be coplanar with azimuthal axis 116A for any orientation of altitude pivot joint 118 or, equivalently, an ability to accommodate, on mount 110, a correspondingly wider optical instrument 120D while permitting optical axis 146 of optical instrument 120D to be coplanar with azimuthal axis 116A for any orientation of altitude pivot joint 118.

While a number of exemplary aspects and embodiments have been discussed above, those of skill in the art will recognize certain modifications, permutations, additions and sub-combinations thereof. For example:

There are a wide variety of pivot joints and similar couplings known in the art and which may become known in the future. Various embodiments of the invention may comprise any suitable pivot joints or similar couplings regardless of their particular construction. More particularly, azimuthal pivot joint 116 may generally comprise any such pivot joint or suitable coupling which permits pivotal movement of mount 110 relative to level surface 114 about azimuthal axis 116A, altitude pivot joint 118 may generally comprise any such pivot joint or suitable coupling which permits pivotal movement of an optical instrument 120 relative to vertical arm 112A about altitude axis 118A and inter-arm pivot joint 140 may generally comprise any such pivot joint or suitable coupling which permits pivotal movement of vertical arm 112A relative to horizontally oriented arm 112B about inter-arm axis 140A.

Pivot joints are described herein as providing pivotal couplings "between" components. Usage of the word "between" in this context is meant to be understood in an operative context (e.g. to refer to the relative pivotal motion between two pivoting components) and pivot joints should not be understood to be strictly located between the two pivoting components. For example, portions of a pivot joint may extend into and/or through one or both pivoting components.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An altitude-azimuthal mount for supporting and orienting optical instruments comprising:

a generally horizontally extending arm coupleable to a level surface by an azimuthal pivot joint which permits pivotal movement of the horizontally extending arm with respect to the level surface about a vertical azimuthal axis;

a generally vertically extending arm pivotally coupled to the horizontally extending arm by an inter-arm pivot joint which permits pivotal movement of the vertically extending arm with respect to the horizontally extending arm about a vertical inter-arm axis; and an instrument coupling mechanism for coupling the mount to an optical instrument, the instrument coupling mechanism comprising an altitude pivot joint which permits pivotal movement of the optical instrument with respect to the vertically extending arm about a horizontal altitude axis;

wherein a first distance b between a location of the inter-arm axis within the vertically oriented arm and an instrument side of the vertically oriented arm associated with the instrument coupling mechanism is smaller than a second distance a between the location of the inter-arm axis within the vertically oriented arm and a side of the vertically oriented arm opposing the instrument side.

2. A mount according to claim 1 wherein the first distance b and the second distance a are distances along the altitude axis.

3. A mount according to claim 1 wherein the inter-arm pivot joint permits the mount to be adjusted between an inside configuration where the optical instrument and the azimuthal axis are located on the same side of the vertically extending arm and an outside configuration where the optical instrument and the azimuthal axis are located on opposite sides of the vertically extending arm.

4. A mount according to claim 1 wherein the inter-arm pivot joint permits the mount to be adjusted between an inside configuration where a center of the optical instrument, as measured along the altitude axis, is separated from the azimuthal axis by an inside distance and an outside configuration where the center of the optical instrument is separated from the azimuthal axis by an outside distance, the outside distance greater than the inside distance.

5. A mount according to claim 3 wherein the mount is a go-to mount comprising a controller for controlling movement of the altitude pivot joint and the azimuthal pivot joint and wherein the controller is configured to make use of inside altitude axis limits $\{alt_{min\_in}, alt_{max\_in}|alt_{min\_in}>0, alt_{max\_in}>0\}$ which confine the angular range of controllable movement of the altitude pivot joint to altitude angles (alt) in a range $-alt_{min\_in} \leq alt \leq alt_{max\_in}$ when the mount is in the inside configuration and to make use of outside altitude axis limits $\{alt_{min\_out}, alt_{max\_out}|alt_{min\_out}>0, alt_{max\_out}>0\}$ which confine the angular range of controllable movement of the altitude pivot joint to altitude angles (alt) in a range $-alt_{min\_out} \leq alt \leq alt_{max\_out}$ when the mount is in the outside configuration; and wherein $alt_{min\_out} > alt_{min\_in}$ and $alt_{max\_out} > alt_{max\_in}$.

6. A mount according to claim 5 comprising an inter-arm axis sensor for providing an indication of whether the mount is in the inside configuration or the outside configuration and wherein controller is configured to automatically determine whether the mount is in the inside configuration or the outside configuration based on the indication from the inter-arm axis sensor.

7. A mount according to claim 5 wherein the controller is configured to determine whether the mount is in the inside configuration or the outside configuration based on user input.

8. A mount according to claim 3 wherein the mount is an auto-tracking mount comprising a controller for controlling movement of the altitude pivot joint and the azimuthal pivot joint and wherein the controller is configured to make use of inside altitude axis limits $\{alt_{min\_in}, alt_{max\_in}|alt_{min\_in}>0, alt_{max\_in}>0\}$ which confine the angular range of controllable movement of the altitude pivot joint to altitude angles (alt) in a range $-alt_{min\_in} \leq alt \leq alt_{max\_in}$ when the mount is in the inside configuration and to make use of outside altitude axis limits $\{alt_{min\_out}, alt_{max\_out} |alt_{min\_out}>0, alt_{max\_out}>0\}$ which confine the angular range of controllable movement of the altitude pivot joint to altitude angles (alt) in a range $-alt_{min\_out} \leq alt \leq alt_{max\_out}$ when the mount is in the outside configuration; and wherein $alt_{min\_hd\_out} > alt_{min\_in}$ and $alt_{max\_out} > alt_{max\_in}$.

9. A mount according to claim 3 wherein the mount is a go-to mount comprising a controller for controlling movement of the altitude pivot joint and the azimuthal pivot joint and wherein the controller is configured to make use of inside altitude axis limits $\{alt_{min\_in}, alt_{max\_in}|alt_{min\_in}>0, alt_{max\_in}>0\}$ which confine the angular range of controllable movement of the altitude pivot joint to altitude angles (alt) in a range $-alt_{min\_in} \leq alt \leq alt_{max\_in}$ when the mount is in the inside configuration and to allow controllable movement of the altitude pivot joint to any altitude angle when the mount is in the outside configuration.

10. A mount according to claim 9 comprising a inter-arm axis sensor for providing an indication of whether the mount is in the inside configuration or the outside configuration and wherein controller is configured to automatically determine whether the mount is in the inside configuration or the outside configuration based on the indication from the inter-arm axis sensor.

11. A mount according to claim 9 wherein the controller is configured to determine whether the mount is in the inside configuration or the outside configuration based on user input from at least one of: a user interface and a communication interface.

12. A mount according to claim 3 wherein the mount is a go-to mount comprising a controller for controlling movement of the altitude pivot joint and the azimuthal pivot joint and wherein the controller is configured to maintain an altitude coordinate (alt) which is representative of the angular orientation of the altitude pivot joint about the altitude axis and wherein the controller is configured to maintain the altitude coordinate (alt) with a first polarity when the mount is in the inside configuration and to maintain the altitude coordinate (alt) with a second, opposing polarity when the mount is in the outside configuration.

13. A mount according to claim 12 wherein the controller is configured to maintain the altitude coordinate (alt) with the second, opposing polarity by negating the altitude coordinate and interpreting movement of the altitude pivot joint in a particular angular direction to have an opposite effect on the altitude coordinate (alt) as compared to when the mount is in the inside configuration.

14. A mount according to claim 4 wherein the mount is a go-to mount comprising a controller for controlling movement of the altitude pivot joint and the azimuthal pivot joint and wherein the controller is configured to make use of inside altitude axis limits $\{alt_{min\_in}, alt_{max\_in}|alt_{min\_\_in}>0, alt_{max\_in}>0\}$ which confine the angular range of controllable movement of the altitude pivot joint to altitude angles (alt) in a range $-alt_{min\_in} \leq alt \leq alt_{max\_in}$ when the mount is in the inside configuration and to make use of outside altitude axis limits $\{alt_{min\_out}, alt_{max\_out}|alt_{min\_out}>0, alt_{max\_out}>0\}$ which confine the angular range of controllable movement of the altitude pivot joint to altitude angles (alt) in a range $-alt_{min\_out} \leq alt \leq alt_{max\_max\_out}$ when the mount is in the outside configuration; and wherein $alt_{min\_out} > alt_{min\_in}$ and $alt_{max\_out} > alt_{max\_in}$.

15. A method for controlling an alt-az mount, the method comprising:
  providing an alt-az mount for supporting and orienting optical instruments which comprises:
  a generally horizontally extending arm coupleable to a level surface by an azimuthal pivot joint which permits pivotal movement of the horizontally extending arm with respect to the level surface about a vertical azimuthal axis;
  a generally vertically extending arm pivotally coupled to the horizontally extending arm by an inter-arm pivot joint which permits pivotal movement of the vertically extending arm with respect to the horizontally extending arm about a vertical inter-arm axis; and
  an instrument coupling mechanism for coupling the mount to an optical instrument, the instrument coupling mechanism comprising an altitude pivot joint which permits pivotal movement of the optical instrument with respect to the vertically extending arm about a horizontal altitude axis;
  wherein the inter-arm pivot joint permits the mount to be adjusted between an inside configuration where the optical instrument and the azimuthal axis are located on the same side of the vertically extending arm and an outside configuration where the optical instrument and the azimuthal axis are located on opposite sides of the vertically extending arm;
  establishing inside altitude axis limits $\{alt_{min\_in}, alt_{max\_in}|alt_{min\_\_in}>0, alt_{max\_in}>0\}$ on the movement of the altitude pivot joint when the mount is in the inside configuration such that an altitude angle (alt) is limited to a range $-\text{alt}_{min\_in} \leq \text{alt} \leq \text{alt}_{max\_in}$ when the mount is in the inside configuration;

establishing outside altitude axis limits $\{\text{alt}_{min\_out}, \text{alt}_{max\_out} | \text{alt}_{min\_out} > 0, \text{alt}_{max\_out} > 0\}$ on the movement of the altitude pivot joint when the mount is in the outside configuration such that the altitude angle (alt) is limited to a range $-\text{alt}_{min\_out} \leq \text{alt} \leq \text{alt}_{max\_out}$ when the mount is in the outside configuration, where $\text{alt}_{min\_out} > \text{alt}_{min\_in}$ and $\text{alt}_{max\_out} > \text{alt}_{max\_in}$; and determining whether the mount is in the inside configuration or the outside configuration to thereby adjust between the first limits and the second limits.

16. A method according to claim 15 wherein determining whether the mount is in the inside configuration or the outside configuration comprises receiving user input indicative of whether the mount is in the inside or outside configuration.

17. A method according claim 15 wherein determining whether the mount is in the inside configuration or the outside configuration comprises automatically determining the inside or outside configuration.

18. A method according to claim 17 wherein automatically determining the inside or outside configuration comprises detecting a signal from a inter-arm axis sensor.

19. An altitude-azimuthal mount for supporting and orienting optical instruments comprising:
  a generally horizontally extending arm coupleable to a level surface by an azimuthal pivot joint which permits pivotal movement of the horizontally extending arm with respect to the level surface about a vertical azimuthal axis;
  a generally vertically extending arm pivotally coupled to the horizontally extending arm by an inter-arm pivot joint which permits pivotal movement of the vertically extending arm with respect to the horizontally extending arm about a vertical inter-arm axis; and
  an instrument coupling mechanism for coupling the mount to an optical instrument, the instrument coupling mechanism comprising an altitude pivot joint which permits pivotal movement of the optical instrument with respect to the vertically extending arm about a horizontal altitude axis;
  wherein the inter-arm pivot joint permits the mount to be adjusted between an inside configuration where the optical instrument and the azimuthal axis are located on the same side of the vertically extending arm and an outside configuration where the optical instrument and the azimuthal axis are located on opposite sides of the vertically extending arm; and
  wherein the mount is a go-to mount comprising a controller for controlling movement of the altitude pivot joint and the azimuthal pivot joint and wherein the controller is configured to make use of inside altitude axis limits $\{\text{alt}_{min\_in}, \text{alt}_{max\_in} | \text{alt}_{min\_in} > 0, \text{alt}_{max\_in} > 0\}$ which confine the angular range of controllable movement of the altitude pivot joint to altitude angles (alt) in a range $-\text{alt}_{min\_in} \leq \text{alt} \leq \text{alt}_{max\_in}$ when the mount is in the inside configuration and to make use of outside altitude axis limits $\{\text{alt}_{min\_out}, \text{alt}_{max\_out} | \text{alt}_{min\_out} > 0, \text{alt}_{max\_out} > 0\}$ which confine the angular range of controllable movement of the altitude pivot joint to altitude angles (alt) in a range $-\text{alt}_{min\_out} \leq \text{alt} \leq \text{alt}_{max\_out}$ when the mount is in the outside configuration; and wherein $\text{alt}_{min\_out} > \text{alt}_{min\_in}$ and $\text{alt}_{max\_out} > \text{alt}_{max\_in}$.

20. A method for controlling an alt-az mount, the method comprising:
  providing an alt-az mount for supporting and orienting optical instruments which comprises:
    a generally horizontally extending arm coupleable to a level surface by an azimuthal pivot joint which permits pivotal movement of the horizontally extending arm with respect to the level surface about a vertical azimuthal axis;
    a generally vertically extending arm pivotally coupled to the horizontally extending arm by an inter-arm pivot joint which permits pivotal movement of the vertically extending arm with respect to the horizontally extending arm about a vertical inter-arm axis; and
    an instrument coupling mechanism for coupling the mount to an optical instrument, the instrument coupling mechanism comprising an altitude pivot joint which permits pivotal movement of the optical instrument with respect to the vertically extending arm about a horizontal altitude axis;
    wherein the inter-arm pivot joint permits the mount to be adjusted between an inside configuration where the optical instrument and the azimuthal axis are located on the same side of the vertically extending arm and an outside configuration where the optical instrument and the azimuthal axis are located on opposite sides of the vertically extending arm;
  maintaining an altitude coordinate (alt) which is representative of the angular orientation of the altitude pivot joint about the altitude axis with a first polarity when the mount is in the inside configuration and maintaining the altitude coordinate (alt) with a second, opposing polarity when the mount is in the outside configuration; and
  determining whether the mount is in the inside configuration or the outside configuration to thereby adjust the polarity of the altitude coordinate (alt).

21. A method according to claim 20 wherein maintaining the altitude coordinate (alt) with the second, opposing polarity comprises negating the altitude coordinate and interpreting movement of the altitude pivot joint in a particular angular direction to have an opposite effect on the altitude coordinate (alt) as compared to when the mount is in the inside configuration.

* * * * *